United States Patent
Goldszmidt et al.

(10) Patent No.: US 7,356,602 B2
(45) Date of Patent: Apr. 8, 2008

(54) METHOD AND APPARATUS FOR DYNAMICALLY ADJUSTING RESOURCES ASSIGNED TO PLURALITY OF CUSTOMERS, FOR MEETING SERVICE LEVEL AGREEMENTS (SLAS) WITH MINIMAL RESOURCES, AND ALLOWING COMMON POOLS OF RESOURCES TO BE USED ACROSS PLURAL CUSTOMERS ON A DEMAND BASIS

(75) Inventors: German Goldszmidt, Dobbs Ferry, NY (US); Jean A. Lorrain, Vence (FR); Kiyoshi Maruyama, Chappaqua, NY (US); Dinesh Chandra Verma, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/347,209

(22) Filed: Feb. 6, 2006

(65) Prior Publication Data

US 2006/0129687 A1    Jun. 15, 2006

Related U.S. Application Data

(63) Continuation of application No. 09/559,065, filed on Apr. 28, 2000, now Pat. No. 7,054,943.

(51) Int. Cl.
*G06F 15/16* (2006.01)
*G06F 15/173* (2006.01)
*G06F 9/46* (2006.01)
*H04J 1/16* (2006.01)

(52) U.S. Cl. ...................... 709/229; 709/226; 718/104; 370/231; 370/236

(58) Field of Classification Search .................... None
See application file for complete search history.

(56) References Cited

U.S. PATENT DOCUMENTS

| | | | |
|---|---|---|---|
| 5,461,611 A | 10/1995 | Drake et al. | |
| 5,719,854 A | 2/1998 | Choudhury et al. | |
| 5,799,173 A | 8/1998 | Gosslwer et al. | |
| 5,838,686 A | 11/1998 | Ozkan | |
| 5,892,754 A | 4/1999 | Kompella et al. | |
| 5,915,095 A | 6/1999 | Miskowiec | |
| 5,996,013 A | 11/1999 | Delp et al. | |
| 6,154,778 A | 11/2000 | Koistinen et al. | |
| 6,167,445 A | 12/2000 | Gai et al. | |
| 6,335,927 B1 | 1/2002 | Elliott et al. | |
| 6,374,112 B1 * | 4/2002 | Widegren et al. | 455/452.2 |
| 6,459,682 B1 | 10/2002 | Ellesson et al. | |
| 6,463,454 B1 | 10/2002 | Lumelsky et al. | |
| 6,502,131 B1 | 12/2002 | Vaid et al. | |
| 6,553,568 B1 * | 4/2003 | Fijolek et al. | 725/111 |

(Continued)

Primary Examiner—Wen-Tai Lin
(74) Attorney, Agent, or Firm—Alison D. Mortinger, Esq.; McGinn IP Law Group, PLLC

(57) ABSTRACT

A method (and system) for managing and controlling allocation and de-allocation of resources based on a guaranteed amount of resource and additional resources based on a best effort for a plurality of customers, includes dynamically allocating server resources for a plurality of customers, such that the resources received by a customer are dynamically controlled and the customer receives a guaranteed minimum amount of resources as specified under a service level agreement (SLA).

36 Claims, 5 Drawing Sheets

U.S. PATENT DOCUMENTS

| | | | |
|---|---|---|---|
| 6,577,642 B1 * | 6/2003 | Fijolek et al. | 370/465 |
| 6,580,721 B1 | 6/2003 | Beshai | |
| 6,680,948 B1 * | 1/2004 | Majd et al. | 370/401 |
| 6,755,642 B2 * | 6/2004 | Zhang | 431/153 |
| 7,016,375 B1 * | 3/2006 | Rosenberg et al. | 370/468 |
| 2001/0053694 A1 | 12/2001 | Igarashi et al. | |
| 2002/0174227 A1 | 11/2002 | Hartsell et al. | |

* cited by examiner

MEASURE R(i), N(i), AND M(i)
COMPUTE Nt(i) AND Rt(i) FROM Mt(i), R(i), N(i) AND M(i),
 AND THEN IF NEEDED, MOVE M(i) TO Mt(i) BY EITHER CHANGING N(i)
 TO Nt(i) OR CHANGING R(i) TO Rt(i).

METHOD AND APPARATUS FOR DYNAMICALLY ADJUSTING RESOURCES ASSIGNED TO PLURALITY OF CUSTOMERS, FOR MEETING SERVICE LEVEL AGREEMENTS (SLAS) WITH MINIMAL RESOURCES, AND ALLOWING COMMON POOLS OF RESOURCES TO BE USED ACROSS PLURAL CUSTOMERS ON A DEMAND BASIS

The present Application is a Continuing Application of U.S. patent application Ser. No. 09/559,065, filed on Apr. 28, 2000, now U.S. Pat. No. 7,054,943.

BACKGROUND OF THE INVENTION

1. Field of the Invention

The present invention relates generally to a world-wide network, and more particularly to sites of a plurality of Internet World Wide Web (WWW) sites of various owners hosted by a service provider using a group of servers and meeting with agreed-upon service levels.

2. Description of the Related Art

The Internet is the world's largest network, and it has become essential to businesses as well as to consumers. Many businesses have started out-sourcing their e-business and e-commerce Web sites to service providers, instead of operating their Web sites on their own server(s) and managing them by themselves. Such a service provider must install a collection of servers in a farm called a "Web Server Farm (WSF)", or a "Universal Server Farm (USF)" which can be used by many different businesses to run their e-commerce and e-business applications. These business customers (e.g., the service provider's "customers") have different "server resource" requirements for their Web sites and applications.

When businesses (hereafter referred to as "customers" or "customers of a server farm") out-source their e-commerce and/or e-business to a service provider, they must obtain some guarantee on the services they are getting (and will continue to obtain) from the service provider for their sites. Once the service provider has made a commitment to a customer to provide a certain "level" of service (e.g., referred to as a "Service Level Agreement (SLA)"), the provider must guarantee that level of service to that customer.

FIG. 1 illustrates an abstracted view of a conventional server farm. A server farm 103 includes multiple servers which host customer applications, and is connected to Internet 101 via communications link(s) 102. Each customer's server resource requirements changes since the demands to customers' applications change continuously on a dynamic basis during each day of operations.

However, a problem with the conventional system and method used thereby is that, hitherto the present invention, there has been no provision for dynamically equipping the server farm such that server(s) and their resources can be dynamically allocated. Hence, there has been no flexibility in dynamically allocating servers and their resources to customers as the customer's demands change. This results in system-wide inefficiency and general dissatisfaction by the customer.

Another problem with the conventional system is that there are no Service Level Agreements (SLAs) based on dynamic allocation and de-allocation of servers to customer's server clusters.

Yet another problem with the conventional system is that there is no provisioning of SLAs in support of both a guaranteed number of servers and optional additional servers based on the workload changes to customers' applications. Yet another problem with the conventional system is that a "hacker" or "hackers" can generate a large amount of workload to a customer's sites or to the server farm itself to "crash" servers or server farm.

SUMMARY OF THE INVENTION

In view of the foregoing and other problems of the conventional methods and structures, an object of the present invention is to provide a method and structure in which an allocation of server resources for a plurality of customers is dynamically controlled.

Another object of the present invention is to support the (minimum, maximum) server resource-based service level agreements for a plurality of customers.

Yet another object of the present invention is to control the allocation of additional server resources to a plurality of customers using the bounds on given service level metrics.

Still another object of the present invention is to support various service level metrics.

A further object of the present invention is to support the use of different metrics for different customers.

Another object of the present invention is to use a service level metric, the amount of allocated resources, and the inbound traffic rate, for defining the state of the current service level (M,N,R) for each customer.

Another object of the present invention is to use a "target" service level metric Mt to keep the actual service level M close to the target service level.

A further object of the present invention is to compute a "target" amount of resources Nt and the inbound traffic rate Rt from a given Mt and (M,N,R).

Still another object of the present invention is to provide and use formulas for computing Nt and Rt from Mt and (M,N,R).

A still further object of the present invention is to allow the use of numerical analysis or quick simulation techniques for deriving Nt and Rt in place of using formulas invented and described in this patent application.

Yet another object of the present invention is to support resource utilization U for M, average response time T for an actual service level M, and the response time percentile T % for the actual service level M (and therefore, the support of targets Ut, Tt and Tt %).

Another object of the present invention is to provide a method (decision algorithm) for deciding whether or not to add additional server resource(s) or to reduce ("throttle down") the inbound traffic to meet the service level agreements for a plurality of customers.

In a first aspect of the present invention, a method (and system) for managing and controlling allocation and de-allocation of resources based on a guaranteed amount of resource and additional resources based on a best effort for a plurality of customers, includes dynamically allocating server resources for a plurality of customers, such that the resources received by a customer are dynamically controlled and the customer receives a minimum (e.g., a minimum that is guaranteed) amount of resources as specified under a service level agreement (SLA).

In another aspect, a program storage device is provided for storing the program of the inventive method.

With the unique and unobvious features of the present invention, a server farm is equipped with a means to dynamically allocate servers (or server resources) to customers as demands change.

It is noted that a general service level agreement (SLA) on a server resource for a customer can be denoted by (Smin#(i), Smax#(i), Mbounds(i)), where Smin#(i) denotes the guaranteed minimum amount of server resources (e.g., the number of servers), Smax(i) denotes the upper bound on the amount of server resources that a customer may want to obtain when free resources are available, and Mbounds(i) gives two bounds: Mhighbound(i) and Mlowbound(i) on a service level metric M that is used in controlling the allocation of resources beyond the minimum for each i-th customer. Mhighbound(i) is used to decide when to add additional server resources and Mlowbound (i) is used to decide when to remove some server resources.

The minimum (or min) amount of server resources (e.g., number of servers) Smin#(i) is a guaranteed amount of server resources that the i-th customer will receive regardless of the server resource usage. The maximum (or max) amount of server resources Smax#(i) is the upper bound on the amount of server resources that the i-th customer may receive beyond the minimum provided that some unused server resources are available for allocation.

Therefore, the range between Smin#(i) and Smax#(i) represents server resources that are provided on an "as-available" or "best-effort" basis, and it is not necessarily guaranteed that the customer will obtain these resources at any one time, if at all. The allocation of additional resource(s) is performed so as to keep the performance metric within Mbounds(i).

Examples of Mbounds(i) include: (1) the bound on the server resource utilization that is denoted by Ubounds(i); (2) the bound on the average server response time that is denoted by Tbounds(i); and (3) the bound on the server response time percentile that is denoted by T%bounds(i).

Table 1 provides definitions and notations used throughout the present application. For example, when Mbounds(i)=Ubounds(i)=(Ulowbound(i),Uhighbound(i)=(50%, 80%), the server farm tries to allocate additional server resources (or de-allocate some servers) to the i-th customer's server complex to keep the server resource utilization between 50% and 80%.

That is, when the server resource utilization goes above 80%, the server farm tries to keep the utilization below 80% by allocating additional server resources to the i-th customer when free resources are available. If free resources are not available, the server farm may need to limit the amount of incoming traffic to the i-th customer's server complex. Conversely, when the server resource utilization goes below 50%, the server farm tries to remove some server resources from the i-th customer in order to keep the utilization above 50%. In order to keep the observed metric M within the given Mbounds, the notion of a "target" metric Mt is introduced. Mt is a value that falls between Mlowbound and Mhighbound and the system of the present invention tries to keep the observed metric M as close as possible to the target metric Mt by adjusting server resources. In general, the unit cost of the server resources above the minimum guarantee is more than or equal to that of the server resources below the minimum.

Thus, the present invention provides a dynamic resource allocation to a plurality of customers to meet with the (min, max) server resources and performance metric based service level agreements. Unused (un-allocated) server resources are pooled and allocated and de-allocated from the pool, thus providing sharing of server resources among plurality of customer, leading to efficient use of server resources. Since incoming workload is regulated when it has exceeded server resources allocated, the system provides a "denial of services" to some workloads, thus preventing a crash of hosted customer sites and preventing a crash of the server farm itself.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
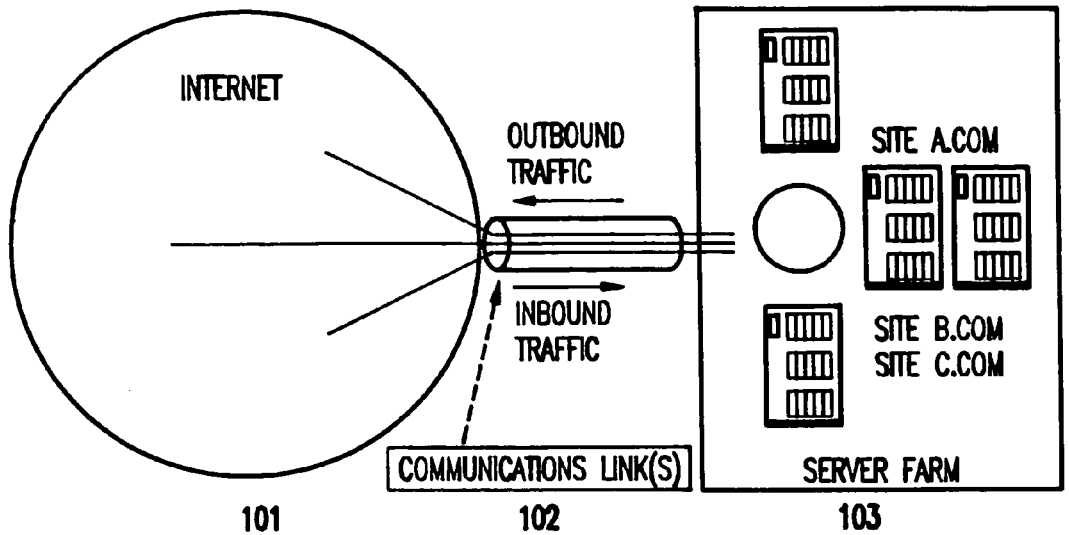
FIG. 1 illustrates an abstracted view of a conventional server farm.

Referring now to the drawings, and more particularly to FIGS. 1-6, there is shown a preferred embodiment of the method and structure according to the present invention.

Preferred Embodiment

Figure 2:
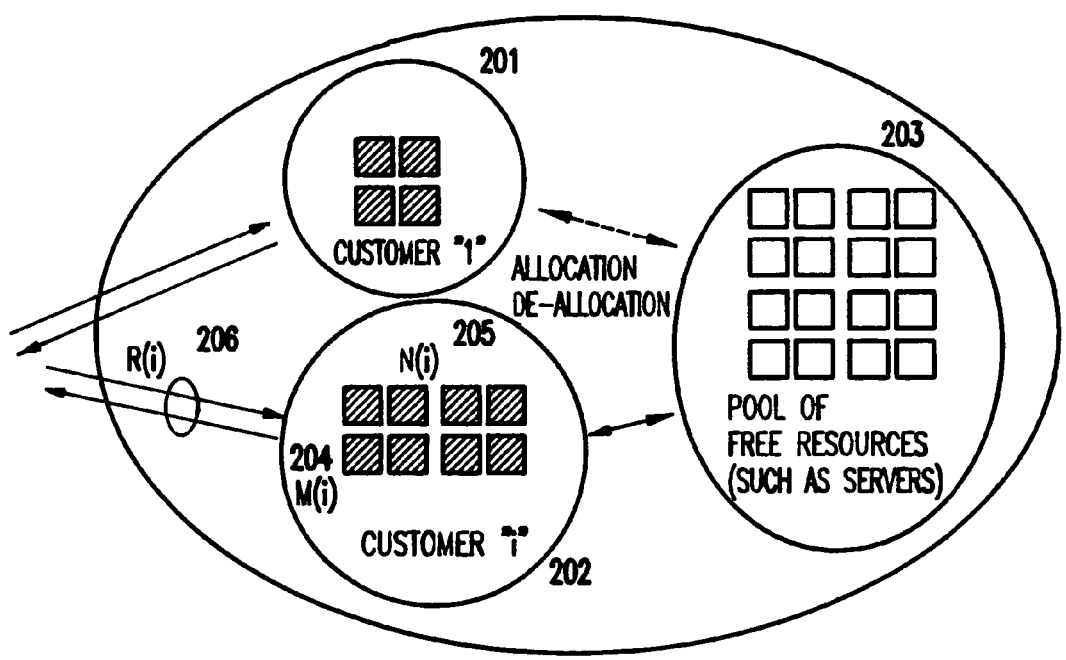
FIG. 2 illustrates a general overview of the operation and structure of the present invention.

Referring to FIG. 2, prior to describing the details of the invention, an overview and a primary object of the present invention will be described below.

As shown in FIG. 2, the invention first monitors the inbound traffic rate R(i) 206, the currently assigned amount of server resources N(i) 205, and the current service level metric M(i) 204 for all customers 201 and 202.

Then, the inventive system performs the following actions only when M(i) falls outside of Mbounds(i), namely either M(i) is above Mhighbound(i) or M(i) is below Mlowbound(i), to avoid "allocation/de-allocation swings".

The "target" amount of server resources Nt(i), without changing the inbound traffic R(i), is computed. Further, the "target" inbound traffic rate Rt(i), without changing the allocated resource N(i), is computed in order to bring the service level metric M(i) close to the "targeted" service level metric Mt(i) from monitored R(i), N(i) and M(i) for all i. The target service level metric Mt(i) is the service level metric at or near which one wants to keep M(i) so that M(i) falls within Mbounds(i)=(Mlowbound(i),Mhighbound(i)).

Once Nt(i) and Rt(i) are computed, then it is decided how to move current M(i) to the target Mt(i), by either changing N(i) to Nt(i) (e.g., this involves either allocating server resources from free resource pool 203 to a customer's server set 201 or 202, or taking some server resources away from customer 201 or 202 and return to the pool 203) or by bounding the inbound traffic rate R(i) to Rt(i) (e.g., this is performed when either the maximum amount of resources has been already allocated or no free resource is available so that the only way to bring M(i) to Mt(i) is to reduce the amount of inbound traffic).

Once the decision has been made, it will then send a request to an appropriate systems resource manager (e.g., a "resource allocation manager" or an "inbound traffic controller").

Figure 3:
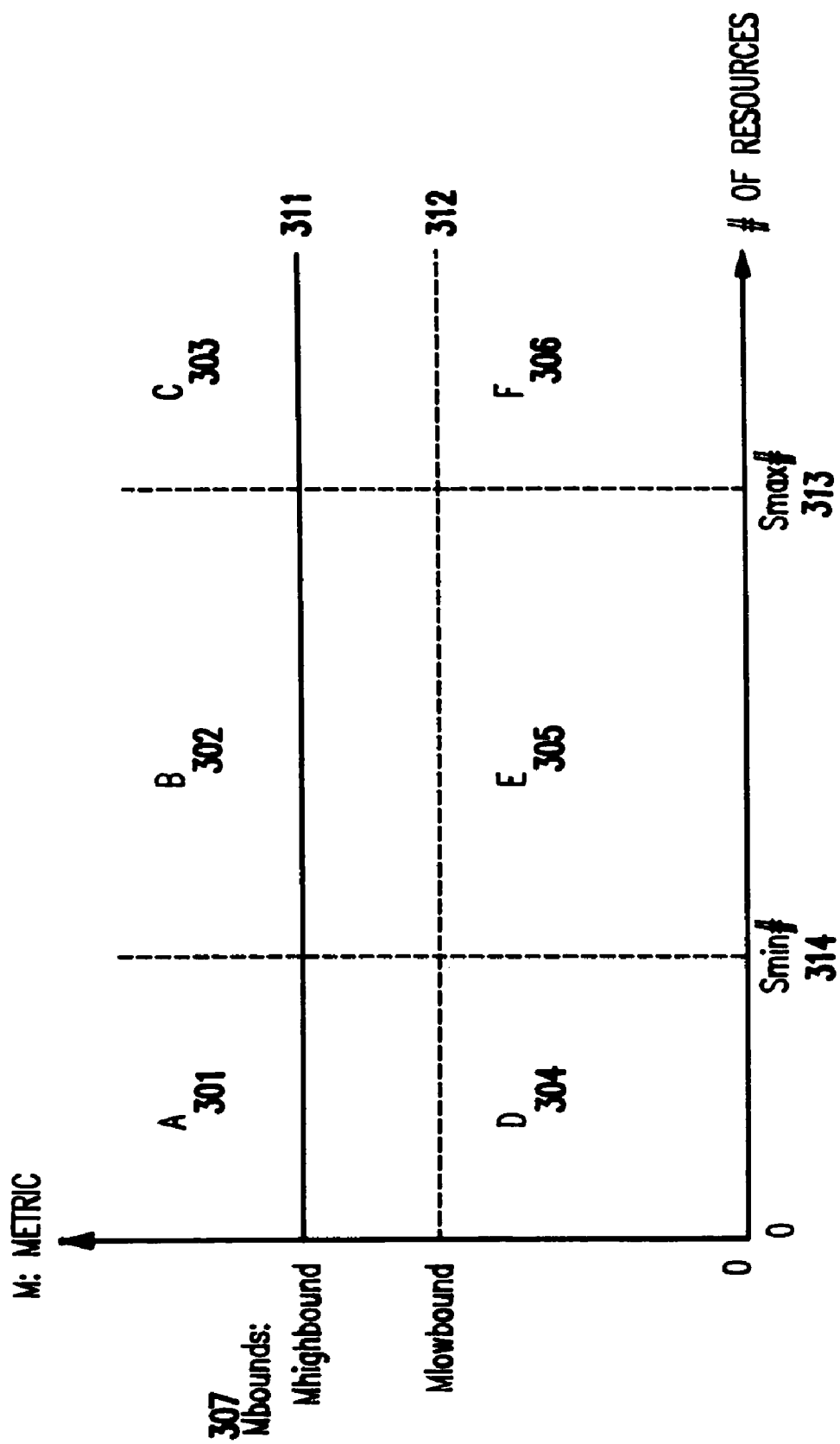
FIG. 3 illustrates a concept of a Service Level Agreement (Smin#, Smax#, Mbounds)

FIG. 3 illustrates the concept of the service level agreement (SLA) that the present invention supports for a plurality of customers. The service level agreement for each customer has the form of (Smin#, Smax#, Mbounds), where Smin# is the guaranteed amount of server resources (e.g., the number of servers), Smax# is the upper bound on the total amount of server resources that a customer may obtain when free resources are available, and Mbounds is a pair of bounds on the service level metric that are used in determining when to add additional resources or to remove some resources away. For ease of illustration, in FIG. 3, the server resource is assumed to have (reside in) a single dimension. However, this could be a vector.

FIG. 3 shows six operation spaces: A 301, B 302, C 303, D 304, E 305 and F 306. Because of the bounds Smin# 314, and Smax# 313, the feasible operation spaces are B 302 and E 305.

It is noted that the operation space D 304 could be made available especially when a server farm operator could "borrow" some servers from some customers when the customers are not fully utilizing their resources.

The operation space B 302 is a "non-desirable" space since the service level metric M is exceeding the bound Mhighbound 311. The operation space E 305 is the space in which the operational state should be kept. Furthermore, the upper portion of the space E 305 that is bounded by Mlowbound 312 and Mhighbound 311 is the operation space allowed by the exemplary service level agreement (SLA) that the present invention supports. It is noted that the metric M may be utilization, average response time, percentile response time, etc. Mbounds 307 may be Ubounds, Tbounds, T%bounds, etc. as suitably determined by the designer given constraints and requirements imposed thereon.

Figure 4:
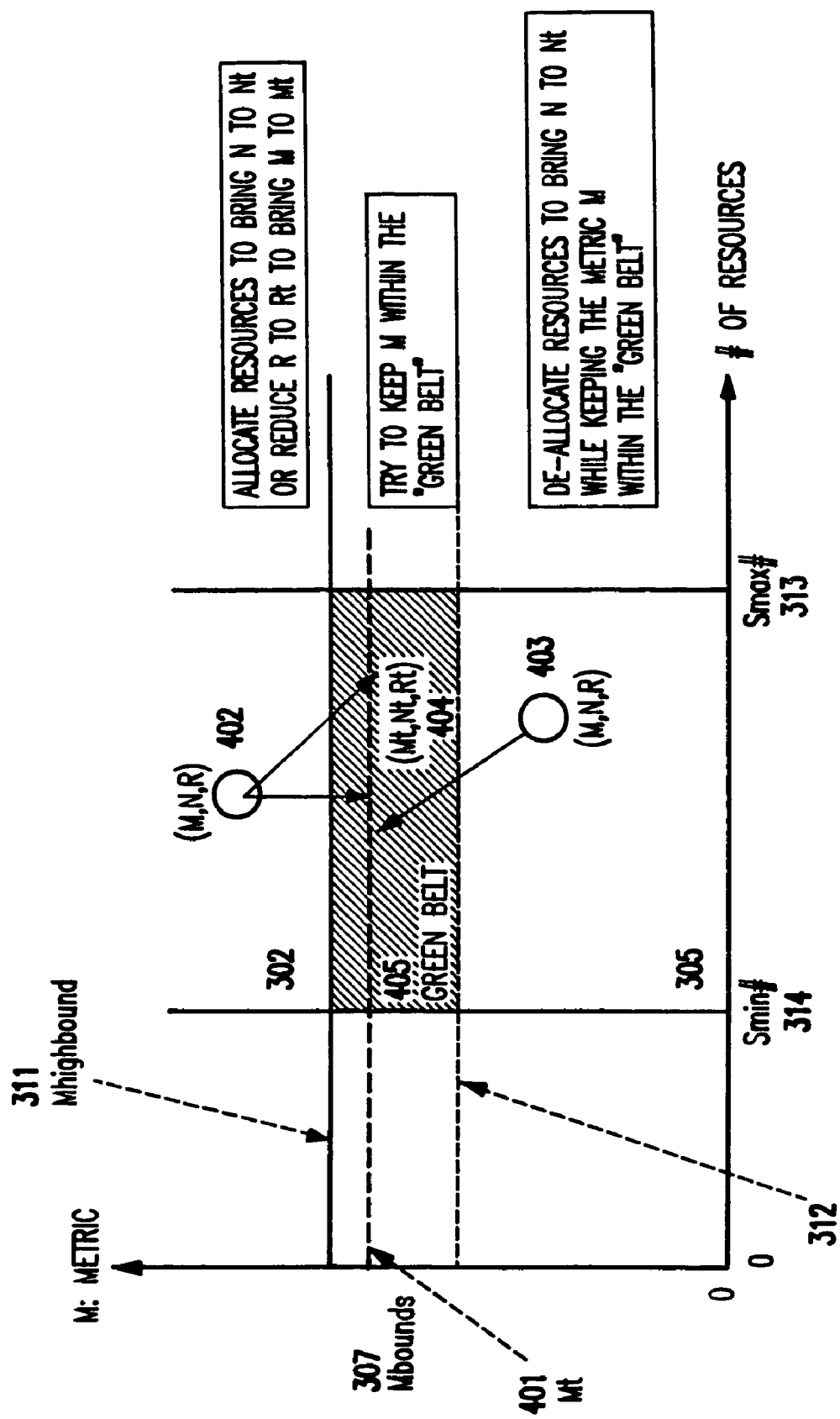
FIG. 4 illustrates a graph showing the relationship of Metric M to the number of server resources, to show a concept of the present invention.

FIG. 4 illustrates a primary concept of the present invention. Here, the operation space 305 is divided into two regions. A first region is called a "green belt" 405 (e.g., the region bounded by Mlowbound 312 and Mhighbound 311), and a second region is the remaining space of the space 305.

In the present invention, the operation state which falls into the green belt 405 is deemed to be acceptable while the operation which falls outside of the green belt (e.g., below the green belt), is not acceptable since too many unnecessary resources are allocated, thereby incurring extra (wasteful) costs to a customer.

FIG. 4 illustrates the target service level metric Mt 401 with respect to the service level metric bound Mbounds 307 and the green belt 405. Mt 401 is the target value that falls within the green belt 405. The upper bound on the green belt 405 is Mhighbound 311 and the lower bound is Mlowbound 312. The green belt 405 is also bounded by Smin# 314 and Smax# 313. Thus, the green belt 405 is a representation of an SLA of the form (Smin#, Smax#, Mbounds).

An object of the dynamic resource allocation according to the present invention is to keep the operation state within the green belt 405. When the current operation state that is denoted by (M,N,R) is at 403 in the space 305, the primary operation is to reduce the currently allocated amount of resources N to the target amount Nt, so that the service level metric M at 403 would move to the target metric Mt at 404.

When the current operation state that is denoted by (M,N,R) is at 402 in the space 302, the current resource N may be increased to Nt when some free resources are available for allocation, or the inbound traffic R may be reduced to Rt so that metric M at 402 would move to Mt at 404. When the current state is within the green belt 405, no action is taken. The green belt 405 therefore defines the allowable system operation state region such that any state within the green belt 405 meets the service level agreement (SLA).

Figure 5:
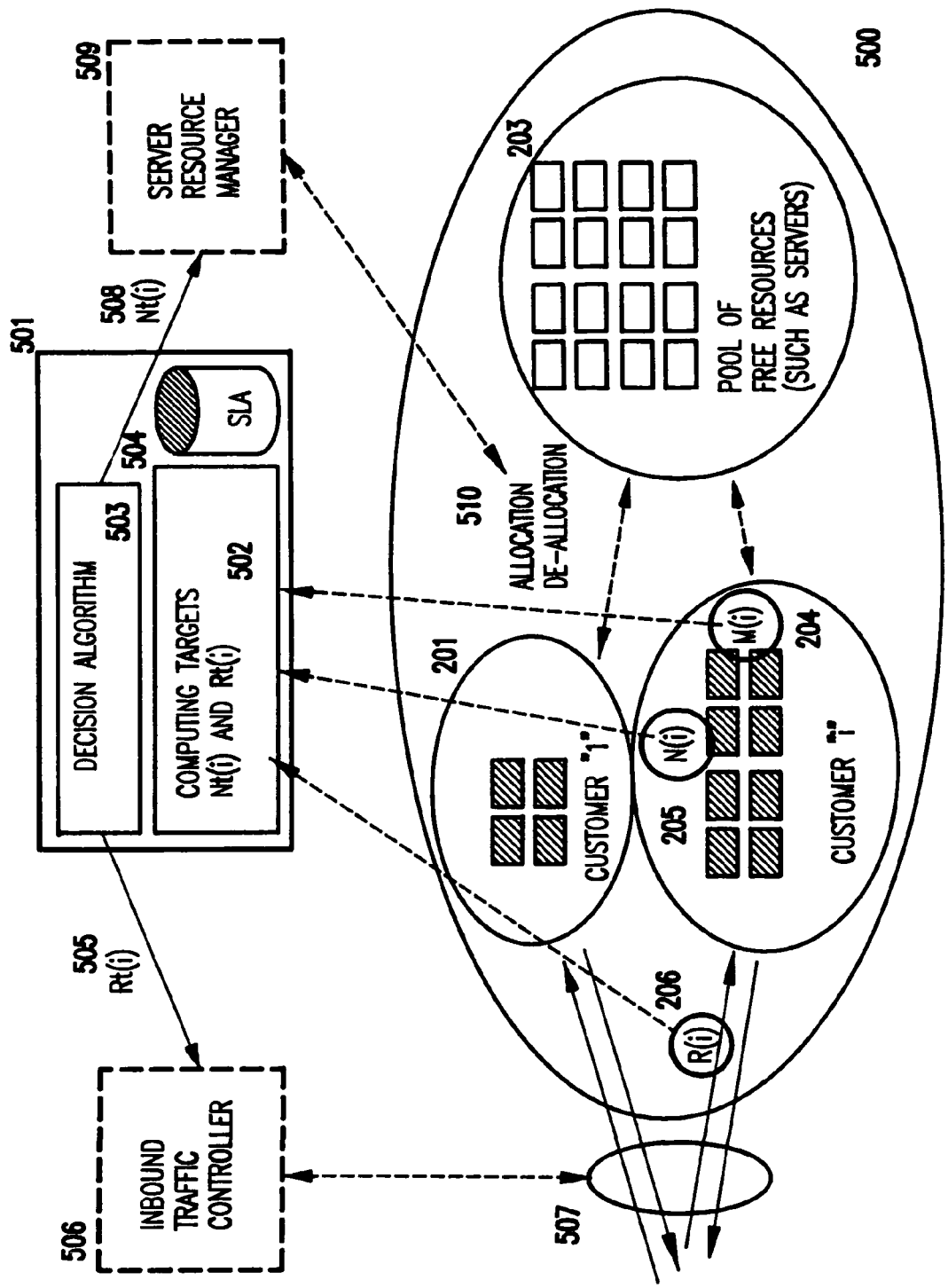
FIG. 5 illustrates an overall system 500 and environment of the present invention.

FIG. 5 illustrates an overall system 500 according to the present invention including a main system 501, an inbound traffic controller 506, and a server resource manager 509.

The main system 501 includes a decision module and methodology 503 (e.g., algorithm), a module 502 (algorithm) for computing targets Nt(i) and Rt(i), and a repository for storing Service Level Agreements (SLA) 504.

The module 502 computes the target values Nt(i) and Rt(i) from the monitored data M(i) 204, N(i) 205 and R(i) 206 for every customer whenever its operation state (M(i),N(i),R(i)) falls outside of the green belt 405 associated with the customer.

Then the decision module 503, using the SLA information, (M(i),N(i),R(i)), Nt(i) and Rt(i), decides what action to take.

That is, the decision module 503 decides either to change the current resource amount from N(i) to Nt(i) 508, or bound the current inbound traffic rate R(i) by Rt(i) 505, and then take appropriate action.

System 501 has a communications means to instruct "server resource manager" 509 to change resource allocation 510. The system 501 has a communications means to instruct "inbound traffic controller" 506 to bound the incoming traffic 507 to a specific customer site (201 or 202).

Tables 2 through 5 give various means in computing or deriving target values Nt(i) and Rt(i) for every customer i.

For example, Table 2 describes formulas for computing these targets when the service level metric M is the resource utilization U.

Table 3 describes a formula for computing these targets when the service level metric M is the average response time T. Here, the average response time was derived from the "M/M/m" multi-server queuing model.

It is noted that since the computation is used for the "hill climbing" optimization and is repeated periodically, and the amount of resources allocated or de-allocated at each step is assumed to be very small compared to the amount of resources currently allocated, the use of "M/M/m" model should be quite acceptable even though the arrival rate might be different from Poisson and the job processing time may not be exponentially distributed. A major advantage of "M/M/m" model is that it offers the closed form formula as shown in Table 3.

Table 4 describes formulas for computing these targets when the service level metric M is the response time percentile T %. Again, the "M/M/m" queuing model is assumed in computing the targets.

Table 5 shows that, instead of using a formula to compute the targets (Nt,Rt), one could use any numerical computation tool or quick simulation tool.

Figure 6:
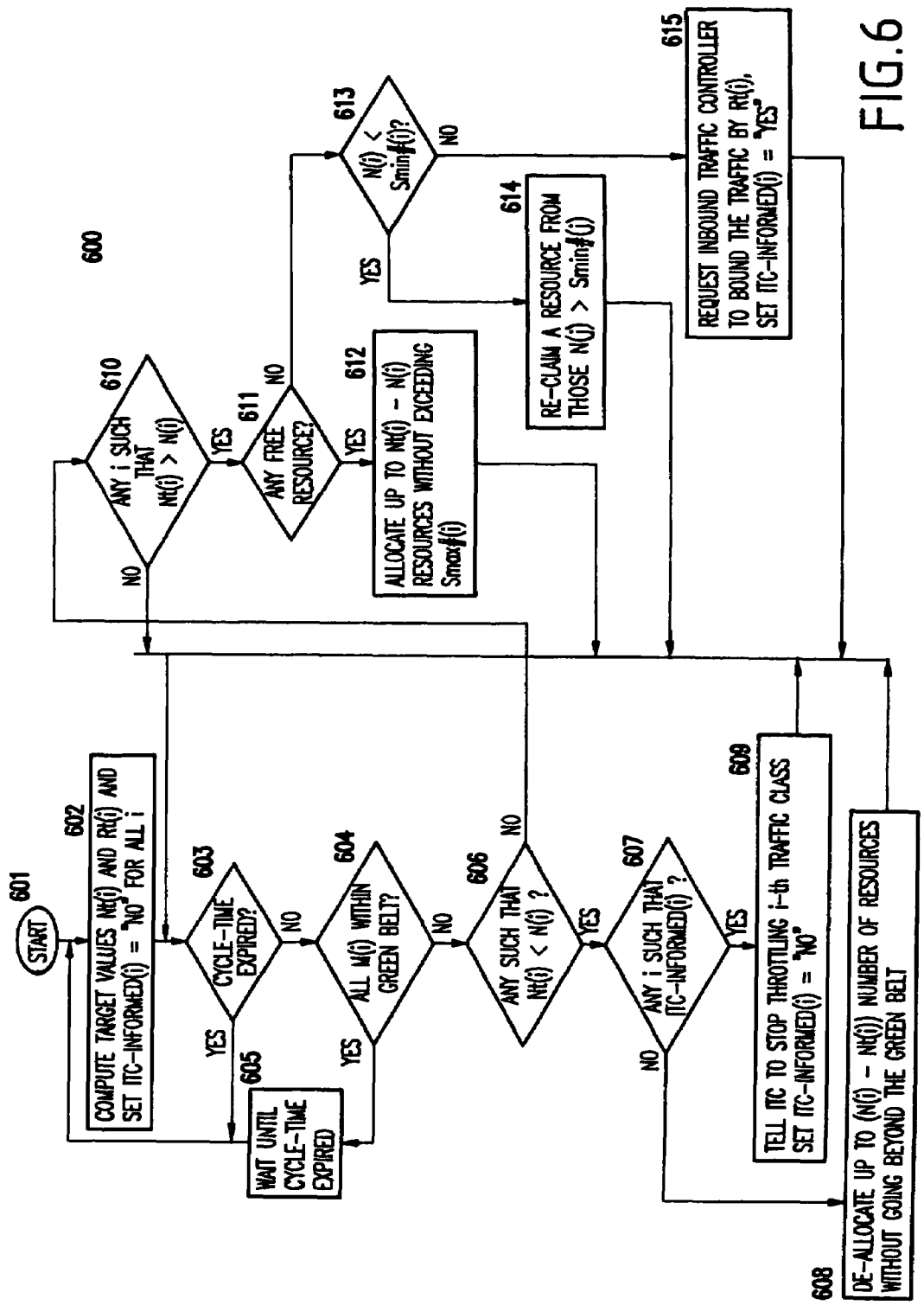
FIG. 6 illustrates a decision method 600 for server allocation.

FIG. 6 describes the decision method 600 employed by module (algorithm) 503 for server resource allocation in the system 501.

The decision method 600 looks for (e.g., attempts to obtain) potential revenue maximization opportunity when allocating free resources to various customers. It first seeks any opportunity to de-allocate resources, next allocates additional resources to customers whose service level metric is outside of the green belt 405 (FIG. 4) and finally looks for when the customer's inbound traffic must be throttled (reduced) due to exhaustion of free resources or the maximum amount of resources has been already allocated.

Method 600 begins at step 601. In step 602, the target values (Nt(i),Rt(i)) are computed for every i. Further, the variable "ITC-informed(i)"="no" is set for all "i". This variable keeps a record of whether or not throttling on inbound traffic has been applied or not prior to the current computation. This computation or examination is performed periodically to check whether or not any service level agreements have been violated, that is, checking whether or not any operation states falls outside of green belts. An examination is conducted in a time interval called a cycle-time. A cycle-time is a system operation configuration parameter. For example, a cycle time value could be selected from a value between 1 second to 60 seconds. Whether to choose a smaller value or a larger value depends on how fast one can adjust resource allocation/de-allocation.

In step 603, it is determined whether or not the service cycle time has expired. If it has expired (e.g., a "YES" in step 603), the process loops back to step 602.

If "NO" in step 603, then in step 604 it is checked whether the operation state M(i) is within the green belt 405 (e.g., see FIG. 4).

If so (e.g., a "YES"), then step 605 is executed in which the system waits for the cycle time to elapse and the process loops back to step 602.

If "NO" in step 604, then in step 606, it is checked whether any customer exists such that the target resource amount Nt(i) is less than the current amount N(i) (i.e., seeking an opportunity to de-allocate server resources from customers and placing them back into the pool of "free" resources).

If "YES" in step 606, one possibility that Nt(i) is less than N(i) is that because the inbound traffic has been throttled. This condition is tested at step 607. Step 606 identifies all those customers such that Nt(i) is less than N(i). Step 607 is applied to only those customers identified in step 606. Step 607 checks if there is any customer whose inbound traffic is currently throttled. If step 607 is "YES", step 609 is executed. Step 609 issues a command to ITC 506 to stop applying the throttling on the i-th customer's inbound traffic. and sets ITC-informed (i)="no".

When Nt(i) is less than N(i) ("YES" in step 606) and the inbound traffic is not throttled ("NO" in step 607), that means that too many resources have been allocated to the given amount of inbound traffic for the i-th customer traffic, step 608 seeks to de-allocate resources away from the i-th customer.

In step 610, it is checked whether the resource(s) must be increased for any customer identified in step 606. There is no action required for those customers whose target value Nt(i) is equal to the observed value N(i). Step 610 identifies a customer whose server resource must be increased.

If so ("YES" in step 610) and if free resources are available ("YES" in step 611), then step 612 is executed to allocate additional resources (e.g., allocate up to Nt(i)-N(i) resources without exceeding Smax#(i)).

When additional resources must be allocated, and yet no free resource is available (e.g., a "NO" in step 611), then it is necessary to "re-claim" resources from those customers who have more than the guaranteed minimum (e.g., N(j)>Smin#(j)) (step 614).

When additional resource(s) must be allocated ("YES" in step 610), and no free resource is available ("NO" in step 611) and if the currently allocated resource N(i) is more than or equal to the guaranteed minimum Smin#(i) ("NO" in step 613), then the inbound traffic must be throttled (step 615). That is, the inbound traffic controller 506 is instructed to bound the traffic by Rt(i), and ITC-informed(i) is set to "YES".

As described above, with the unique and unobvious features of the present invention, a dynamic resource allocation is provided to a plurality of customers to meet with the (min,max) server resources and performance metric-based service level agreements.

When describing the embodiment of this invention, often a fixed size unit of allocable or de-allocable resources were assumed. However, one can easily generalize to the case where each allocable unit has a different amount.

Further, it is noted that the method of the invention may be stored on a storage medium as a series of program steps, and can be executed by a digital data processing apparatus.

While the invention has been described in terms of a preferred embodiment, the invention is not limited thereto and those skilled in the art will recognize that the invention can be practiced with modification within the spirit and scope of the appended claims.

TABLE 1

| | |
|---|---|
| Smin#(i): | the amount of resources guaranteed for the i-th customer. This can be a vector. |
| Smax#(i): | the maximum amount of service resources that could be made available to the i-th customer. This can be a vector. |
| Mbounds(i): | the bounds on the service level metric. Each "bounds" consists of a pair, "highbound" and "lowbound." |
| Ubounds(i): | the bound on the utilization of resources allocated to the i-th customer |
| Tbounds(i): | the bound on the agreed upon average server response time for the i-th customer |
| T % bounds(i): | the bound on the agreed upon server response time percentile for the i-th customer |
| (Smin#(i), Smax#(i), Mbound(i)): | the SLA supported by the invention |
| N(i): | the number (or amount of) of resources currently allocated to the i-th customer. |
| R(i): | the current inbound traffic rate for the i-th customer. This could be a vector when more than one type of traffic is defined for each customer. |
| M(i): | the current value of the metric M for the i-th customer. This could be a vector. Examples are: U(i): the current utilization of the allocated resources to the i-th customer T(i): currently observed server response time averaging for the l-th customer T % (i): currently observed server response time percentile for the l-th customer |
| Mt(i): | the "target" (want to achieve) metric value for the i-th customer. Its dimension is the same as the dimension of M(i). This is within the defined "green belt" which is the region within which M(i) is kept. Examples of Mt(i) are: Ut(i): the target resource utilization when M = U, Tt(i): the target average response time when M = T Tt % (i): the target percentile response time when M = T % |

TABLE 2

For Utilization as Metric: M = U and Mt = Ut
The following relationships hold among various variables:
$U(i) = C(i)R(i)/N(i)$, where $C(i)$ is a constant
$Ut(i) = C(i)R(i)/Nt(i)$, and
$Ut(i) = C(i)Rt(i)/N(i)$.
From the above and from the given values of N(i), R(i), U(i), and the target value Ut(i), Nt(i) and Rt(i) can be computed as follow:
$Nt(i) = $ CEILING $[N(i)U(i)/Ut(i)]$, and
$Rt(i) = $ FLOOR $[R(i)Ut(i)/U(i)]$,
where CEILING gives the smallest integer exceeding and FLOOR gives the largest integer not exceeding.

TABLE 3

For Average Response Time as Metric: M = T and Mt = Tt
S(i): server "service" (or processing) time for the i-th customer, this can be computed from observing each individual server service time, or estimated from a queueing formula:
  S(i) is a function of {T(i), R(i), N(i)}
  If the cluster of servers is modeled by the M/M/m queueing system,
  $S(i) = ((R(i)T(i) + N(i) + p\{N(i)\}) - $
  $SQRT((R(i)T(i) + N(i) + p\{N(i)\})^{**}2 - 4R(i)T(i)R(i)/2R(i)$
  where p{m} is the probability that there are m requests in the i-th customer's server cluster
For the M/M/m queuing model,
  $Tt(i) \sim S(i) + p\{Nt(i)\}S(i)/(Nt(i) - R(i)S(i))$
  $Tt(i) \sim S(i) + p\{N(i)\}S(i)/(N(i) - Rt(i)S(i))$
Therefore,
  $Nt(i) = $ CEILING $[R(i)S(i) + p\{Nt(i)\}S(i)/(Tt(i) - S(i))]$
  $Rt(i) = $ FLOOR $[N(i)/S(i) - p\{N(i)\}/(Tt(i) - S(i))]$
where p{m} is the probability that there are m requests in the customer's server cluster.

TABLE 4

For Percentile Response Time as Metric: M = T % and Mt = Tt %
If T % (i) > T % bound(i), then the average response time T(i) needs to be reduced by (T % (i) - T(i)). Therefore, for T % (i) to approach T % bound, the average response time target Tt(i) becomes:
  $Tt(i) = T(i) - (T \% (i) - T \% $ bound$(i))$.
For the M/M/m queueing model,
  $Tt(i) \sim S(i) + p\{Nt(i)\}S(i)/(Nt(i) - R(i)S(i))$
  $Tt(i) \sim S(i) + p\{N(i)\}S(i)/(N(i) - Rt(i)S(i))$
and thus,
  $Nt(i) = $ CEILING $[R(i)S(i) + p\{Nt(i)\}S(i)/(Tt(i) - S(i))]$
  $Rt(i) = $ FLOOR $[N(i)/S(i) - (p\{N(i)\}/Tt(i) - S(i))]$
where p{m} is the probability that there are m requests in the customer's server cluster

TABLE 5

For any given metric M,
There are quick simulation tools, quick numerical computation tools and other approximation formula are available in computing Nt(i) and Rt(i) from given (i.e., measured) values of R(i), N(i) and M(i).

What is claimed is:

1. A method for managing and controlling allocation and de-allocation of resources based on a guaranteed amount of resource and additional resources based on a best effort for a plurality of customers, said method comprising:
   dynamically allocating server resources for a plurality of customers, such that said resources received by a customer are dynamically controlled and said customer receives a guaranteed minimum amount of resources as specified under a service level agreement (SLA), wherein said best effort is defined in said SLA as a range of service to be provided to said customer if said server resources are currently available; and
   designating a service level agreement (SLA) on a server resource for a customer as a form (Smin#(i), Smax#(i), Mbounds(i)), where Smin#(i) denotes a guaranteed minimum amount of server resources, Smax(i) denotes an upper bound on an amount of server resources that a customer desires to obtain when free resources are available, and Mbounds(i) that includes a low bound (Mlowbound(i)) and a high bound (Mhighbound(i)) designating bounds on a service level metric for allocating resources beyond the minimum amount Smin#(i) for each i-th customer.

2. The method according to claim 1, further comprising: utilizing a performance metric to increase or decease an inbound traffic to a customer.

3. The method according to claim 1, further comprising: supporting minimum and maximum server resource-based service level agreements for a plurality of customers.

4. The method according to claim 1, further comprising: utilizing performance metrics to control the allocation of additional server resources to a plurality of customers using bounds on given service level metrics.

5. The method according to claim 1, further comprising: supporting a plurality of service level metrics.

6. The method according to claim 1, further comprising: selectively utilizing a plurality of different metrics for a plurality of different customers.

7. The method according to claim 1, further comprising: utilizing a service level metric, an amount of allocable resources, and an inbound traffic rate, for defining a state of a current service level (M,N,R) for each customer.

8. The method according to claim 1, further comprising: utilizing a target service level metric Mt to maintain an actual service level M substantially at or near a target service level so as to be guaranteed to fall between low and high bounds (Mlowbound and Mhighbound) specified in a service level agreement (SLA).

9. The method according to claim 1, further comprising: computing a target amount of resources Nt and an inbound traffic rate Rt from a given target service level metric Mt and (M,N,R).

10. The method according to claim 1, further comprising: performing at least one of a numerical analysis, a mathematical formulaic operation, an add-one/subtract-one, and a quick simulation for deriving a target amount of resources Nt and an inbound traffic rate Rt.

11. The method according to claim 1, further comprising: supporting a resource utilization U for an actual service level M, average response time T for an actual service level M, and a response time percentile T % for an actual service level M, thereby to support targets of Ut, Tt and Tt %.

12. The method according to claim 1, further comprising: deciding whether or not to add a server resource or to reduce an inbound traffic rate to meet service level agreements for a plurality of customers.

13. The method according to claim 1, further comprising: providing a server farm including means for dynamically allocating servers or server resources to customers as demands of said customers change.

14. The method according to claim 1, wherein a minimum amount of server resources Smin#(i) comprises a guaranteed amount of server resources that the i-th customer will receive regardless of the server resource usage, and wherein a maximum amount of server resources Smax#(i) comprises the upper bound on the amount of server resources that the i-th customer may receive beyond the minimum amount provided that some unused server resources are available for allocation.

15. The method according to claim 14, wherein a range between Smin#(i) and Smax#(i) represents server resources that are provided on an as-available basis, such that the customer is not guaranteed to obtain these resources at any one time, if at all.

16. A method for managing and controlling allocation and de-allocation of resources based on a guaranteed amount of resource and additional resources based on a best effort for a plurality of customers, said method comprising:
dynamically allocating server resources for a plurality of customers, such that said resources received by a customer are dynamically controlled and said customer receives a guaranteed minimum amount of resources as specified under a service level agreement (SLA),
wherein said best effort is defined in said SLA as a range of service to be provided to said customer if said server resources are currently available,
wherein an allocation of an additional resource is performed so as to keep the performance metric within Mbounds(i), and
wherein said Mbounds(i) includes any one of bounds on the server resource utilization that are denoted by Ubounds(i), bounds on the average server response time that are denoted by Tbounds(i), and bounds on the server response time percentile that are denoted by T%bounds(i).

17. A method for managing and controlling allocation and de-allocation of resources based on a guaranteed amount of resource and additional resources based on a best effort for a plurality of customers, said method comprising:
dynamically allocating server resources for a plurality of customers, such that said resources received by a customer are dynamically controlled and said customer receives a guaranteed minimum amount of resources as specified under a service level agreement (SLA),
wherein said best effort is defined in said SLA as a range of service to be provided to said customer if said server resources are currently available; and
when a server resource utilization goes above a predetermined set limit Mhighbound(i), attempting, by a server farm, to maintain the utilization between said predetermined set limits Mbounds(i) by allocating additional server resources to the i-th customer when free resources are available.

18. The method according to claim 17, further comprising:
if free resources are not available, then limiting, by the server farm, an amount of incoming traffic to the i-th customer's server.

19. The method according to claim 1, further comprising:
controlling a dynamic resource allocation to said plurality of customers to meet a value between the minimum and maximum server resources and performance metric-based service level agreements.

20. A method for managing and controlling allocation and de-allocation of resources based on a guaranteed amount of resource and additional resources based on a best effort for a plurality of customers, said method comprising:
dynamically allocating server resources for a plurality of customers, such that said resources received by a customer are dynamically controlled and said customer receives a guaranteed minimum amount of resources as specified under a service level agreement (SLA),
wherein said best effort is defined in said SLA as a range of service to be provided to said customer if said server resources are currently available;
monitoring an inbound traffic rate R(i), a currently assigned amount of server resources N(i), and a current service level metric M(i) for all of said plurality of customers.
computing a target amount of server resources Nt(i), without changing an inbound traffic R(i); and
computing a target inbound traffic rate Rt(i), without changing an allocated resource N(i), to bring the service level metric M(i) to the targeted service level metric Mt(i) from monitored R(i), N(i) and M(i) for all i,
wherein the target service level metric Mt(i) comprises the service level metric substantially at or near where M(i) is to be maintained, and bounded by Mbounds(i).

21. The method according to claim 20, further comprising:
determining how to adjust a current M(i) to the target Mt(i), by one of changing N(i) to Nt(i) and by bounding the inbound traffic rate R(i) to Rt(i).

22. The method according to claim 21, further comprising:
requesting a system resource manager to perform the resource allocation.

23. The method according to claim 22, further comprising:
requesting an inbound traffic controller to throttle an amount of inbound traffic to the plurality of customers.

24. The method according to claim 1, further comprising: maximizing revenue potential when allocating resources beyond a minimum amount for a customer.

25. The method according to claim 1, wherein a unit of said resources comprises a fixed size unit of allocable or de-allocable resources.

26. The method according to claim 1, wherein a unit of each allocable resource has a different amount.

27. A method of deciding server resource allocation for a plurality of customers, said method comprising:
computing target values (Nt(i),Rt(i)) for every customer i and setting a variable "ITC-informed(i)"="no" for all customers "i" such that a record is kept of whether or not throttling on inbound traffic is being applied or not during a given service cycle time;
determining whether or not the service cycle time has expired;
if the service cycle time has not expired, then checking whether an operation state M(i) is within a predetermined area defined by a metric and a number of resources;
if the operation state is not within the predetermined area, then checking whether any customer exists such that a target resource amount Nt(i) is less than a current resource amount N(i);
if Nt(i) is less than N(i), then determining whether the inbound traffic has been throttled, by determining whether, for any "i", ITC-informed(i) ="yes"; and
if the inbound traffic has been throttled, then removing the throttling by directing an inbound traffic controller to stop throttling i-th traffic class and setting ITC-informed (i)="no",
wherein said target values (Nt(i),Rt(i)) comprise parameters contained in a Service Level Agreement (SLA) for said customer i as related to a best effort basis for managing and controlling allocation and de-allocation of resources to said customer i, and said best effort is defined in said SLA as a range of service to be provided to said customer i if said server resources are currently available.

28. The method according to claim 27, further comprising:
when $Nt(i)$ is less than $N(i)$ and it is determined that the inbound traffic is not throttled, deallocating resources from said customers.

29. The method according to claim 28, further comprising:
determining whether the resources must be increased by selecting any i and determining whether $Nt(i)$ is greater than $N(i)$.

30. The method according to claim 29, further comprising:
if it is determined that $Nt(i)$ is greater than $N(i)$ and if free resources are judged to be available, then allocating additional resources up to $Nt(i)-N(i)$ resources without exceeding a maximum amount of server resources $Smax\#(i)$).

31. The method according to claim 29, further comprising:
if it is determined that $Nt(i)$ is greater than $N(i)$ and if free resources are judged to be unavailable and if the currently allocated resource $N(i)$ is less than the guaranteed minimum $Smin\#(i)$, then reclaiming resources from those customers j having more than a guaranteed minimum such that $N(j)>Smin\#(j)$.

32. The method according to claim 29, further comprising:
if it is determined that $Nt(i)$ is greater than $N(i)$ and if free resources are judged to be unavailable and if the currently allocated resource $N(i)$ is more than or equal to the guaranteed minimum $Smin\#(i)$, then throttling the inbound traffic.

33. The method according to claim 32, further comprising:
bounding, by the inbound traffic controller, the traffic by $Rt(i)$.

34. The method according to claim 27, further comprising:
searching for a potential revenue maximization opportunity when allocating free resources to various customers.

35. The method according to claim 34, further comprising:
first seeking to de-allocate resources, then allocating additional resources to customers whose service level metric is outside of a predetermined area, and thirdly searching for when the customer's inbound traffic must be throttled due to exhaustion of free resources or the maximum amount of resources has been already allocated.

36. A system for managing and controlling allocation and de-allocation of resources based on a guaranteed amount of resources and additional resources based on a best effort for a plurality of customers, said system comprising:
plurality of servers; and
a resource allocation device for dynamically allocating server resources for a plurality of customers, such that said resources received by a customer are dynamically controlled and said customer receives a guaranteed minimum amount of resources as specified under a best effort agreement in a service level agreement (SLA) with said customer,
wherein said best effort is defined in said SLA as a range of service to be provided to said customer if said server resources are currently available.

* * * * *